United States Patent [19]

Warner

[11] Patent Number: 4,789,769

[45] Date of Patent: Dec. 6, 1988

[54] ADJUSTABLE ELECTRODE HOLDER

[76] Inventor: Allan Warner, 50 Haliday St., Clark, N.J. 07066

[21] Appl. No.: 77,033

[22] Filed: Jul. 21, 1987

Related U.S. Application Data

[63] Continuation of Ser. No. 808,523, Dec. 13, 1985, abandoned.

[51] Int. Cl.$^4$ .............................................. B23K 9/32
[52] U.S. Cl. .............................. 219/86.25; 219/69 E; 219/119
[58] Field of Search ............ 403/21; 219/86.25, 86.32, 219/69 E, 119; 269/287

[56] References Cited

U.S. PATENT DOCUMENTS

| | | | |
|---|---|---|---|
| 3,263,059 | 7/1966 | Rzant | 219/119 |
| 3,307,016 | 2/1967 | Vancott | 219/119 |
| 4,451,722 | 5/1984 | Szantho et al. | 219/86.25 |
| 4,510,370 | 4/1985 | Szantho et al. | 219/86.25 |

Primary Examiner—E. A. Goldberg
Assistant Examiner—Lincoln Donovan
Attorney, Agent, or Firm—Lerner, David, Littenberg, Krumholz & Mentlik

[57] ABSTRACT

An electrode holder is provided with an adjustment mechanism adapted to permit the manual adjustment of the electrode relative to the holder. The adjustment mechanism is accessible to an operator when the electrode and the holder are in place during a normal fusing operation, whereby the position of the electrode can be adjusted without having to remove the holder of the electrode itself.

19 Claims, 3 Drawing Sheets

ADJUSTABLE ELECTRODE HOLDER

This is a continuation of application Ser. No. 808,523 filed Dec. 13, 1985, now abandoned. su

FIELD OF THE INVENTION

The present invention relates to electrode holders, and, more particularly, to electrode holders adapted to hold electrodes whose position must be periodically adjusted.

BACKGROUND OF THE INVENTION

Fusing machines have traditionally employed many different types of electrode holders. One type of electrode holder is disclosed in U.S. Pat. No. 4,510,370, which is owned by the assignee of the present application. Although the electrode holder of the '370 patent permits the position of an associated electrode to be adjusted, such adjustment can only be accomplished by removing the electrode or the entire electrode holder. The need to remove the electrode or the entire electrode holder increases the time required to adjust the position of the electrode, thereby increasing the downtime of the fusing machine during electrode adjustment or replacement.

SUMMARY OF THE PRESENT INVENTION

The present invention relates to a new and improved electrode holder which includes a holding mechanism, such as a reamed hole, adapted to hold an electrode. The holding mechanism communicates with a cavity provided in an outer surface of the holder. A positioning mechanism in the form, for example, of a stop extends into the holding mechanism from the cavity for the purpose of positioning the electrode in the holding mechanism. The position of the positioning mechanism is controlled manually by an adjusting mechanism which is mounted in the cavity so as to be accessible to an operator when the electrode and the holder are in place during a normal fusing operation. Because the position of the electrode can be adjusted without having to remove the holder or the electrode itself, manual electrode adjustments can be made quickly and easily, thereby minimizing the downtime of the fusing machine.

In one embodiment, the positioning mechanism includes a screw, which is non-rotatably mounted in the holder, and the adjusting mechanism includes a thumb nut, which is threadedly received on the screw. The rotation of the thumb nut causes the axial movement of the screw to thereby control the extent to which the screw extends into the holding mechanism and hence the position of the electrode relative to the holding mechanism.

BRIEF DESCRIPTION OF THE DRAWINGS

For a more complete understanding of the present invention, reference is made to the following detailed description of an exemplary embodiment considered in conjunction with the accompanying drawings, in which.

DESCRIPTION OF THE EXEMPLARY EMBODIMENT

Although the present invention is applicable to many different types of electrode holder assemblies, it is especially suitable for use in connection with the electrode holder assembly disclosed in U.S. Pat. No. 4,510,370. Accordingly, the present invention will be described in connection with the electrode holder assembly of the '370 patent, the specification of which is incorporated herein by reference.

Figure 1:
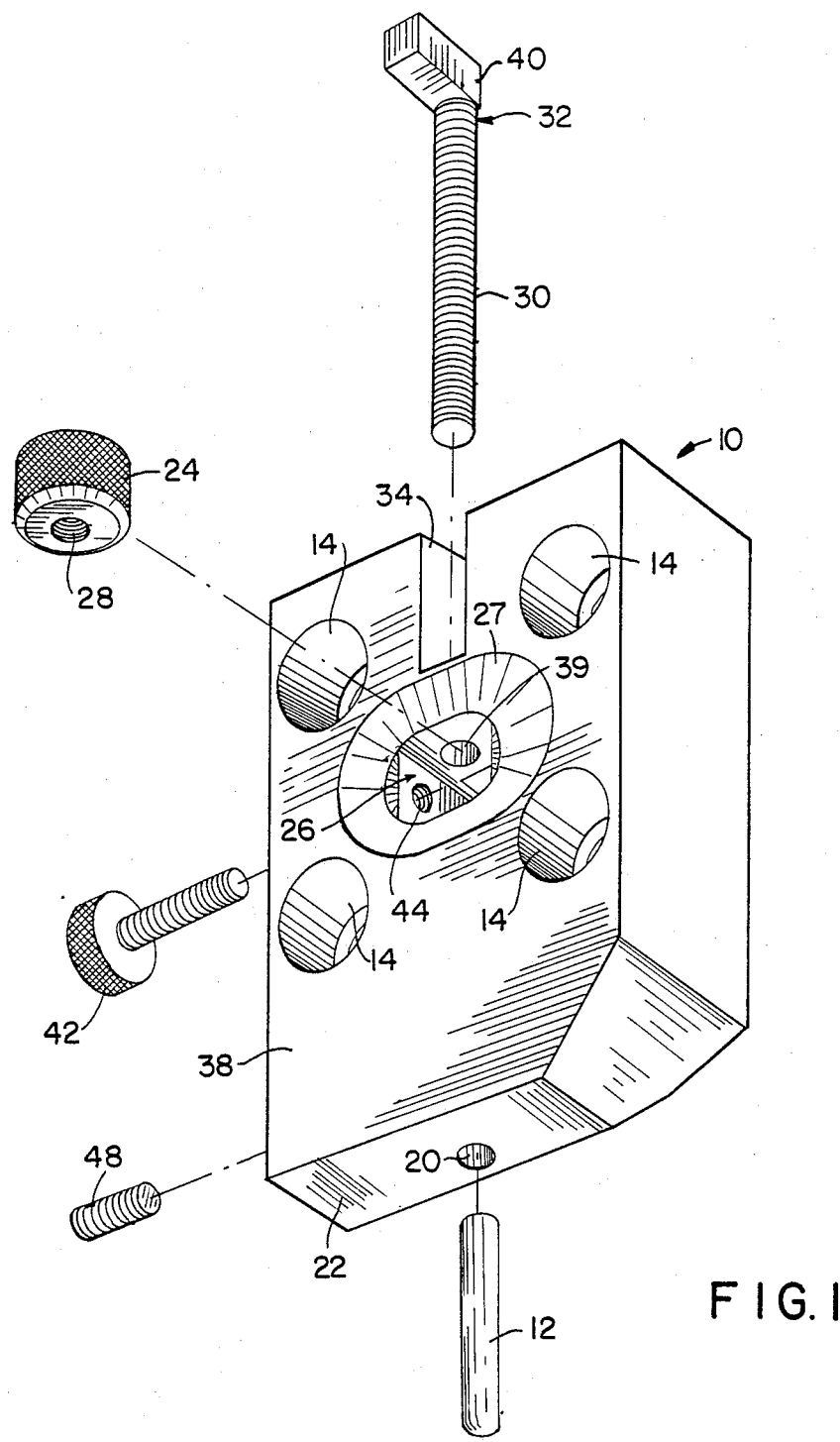
FIG. 1 is an exploded perspective view of an electrode holder constructed in accordance with the present invention.
Figure 2:
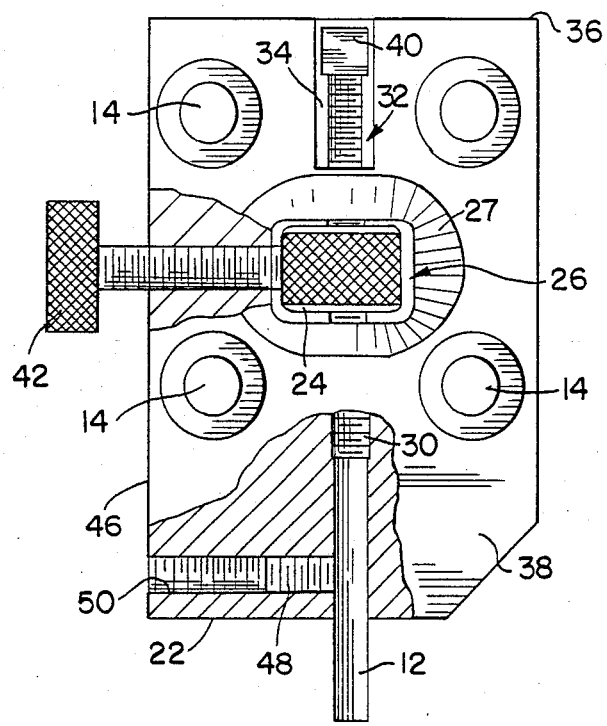
FIG. 2 is a front elevational view of the electrode holder illustrated in FIG. 1, portions of the holder being broken away to facilitate consideration and discussion.
Figure 3:
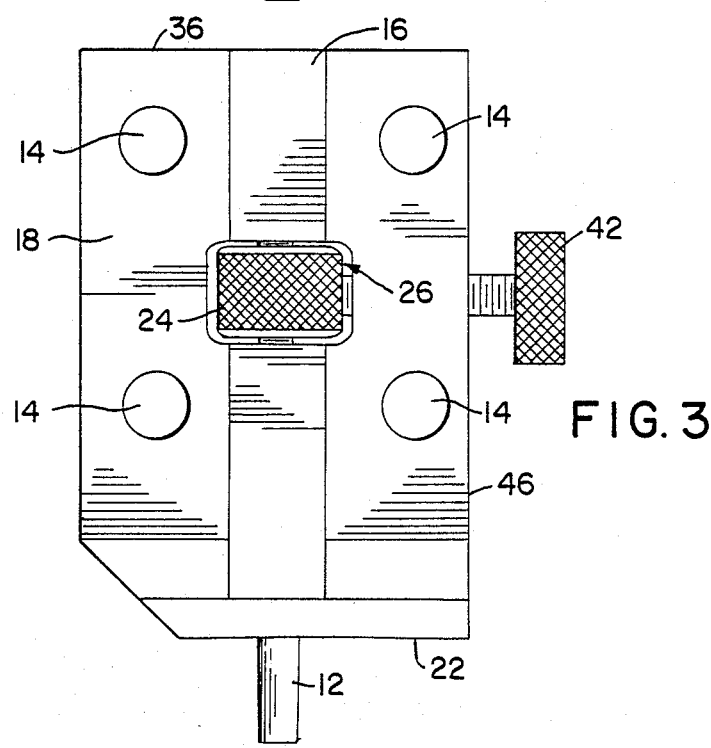
FIG. 3 is a back elevational view of the electrode holder illustrated in FIG. 1.
Figure 4:
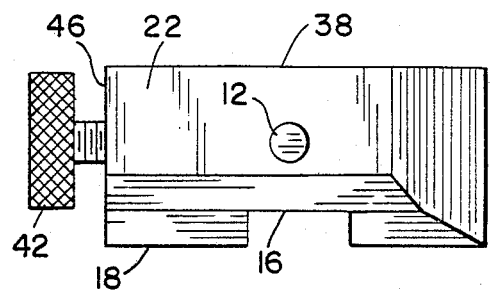
FIG. 4 is a bottom view of the electrode holder illustrated in FIG. 1.
Figure 5:
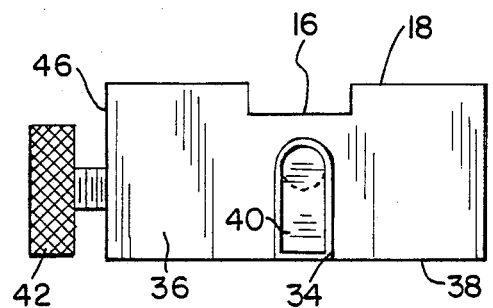
FIG. 5 is a top view of the electrode holder illustrated in FIG. 1.

Referring to FIGS. 1-5, there is shown an electrical holder 10 adapted to adjustably hold a cylindrical fusing electrode 12. The electrode holder 10 includes holes 14 adapted to receive cap screws (not shown) for removably attaching the electrode holder 10 to another electrode holder, such as element 58 of U.S. Pat. No. 4,510,370 or a similar element of another fusing electrode assembly. A keyway 16 formed in a rear surface 18 of the electrode holder 10 is adapted to receive a key (not shown) provided on a mating element of another electrode holder, such as element 58 of U.S. Pat. No. 4,510,370 or a similar element of another fusing electrode assembly.

The fusing electrode 12 is slidably received in a reamed hole 20 provided in a lower surface 22 of the electrode holder 10. A thumb nut 24 is rotatably received in a cavity 26 which extends completely through the electrode holder 10 and which includes a countersink 27. The thumb nut 24 has internal threads 28 which threadedly engage external threads 30 provided on a stop screw 32, which extends from a slot 34 provided in an upper surface 36 and a front surface 38 of the electrode holder 10, through a drill hole 39 and the thumb nut 24 and into the reamed hole 20. The stop screw 32 includes a head 40, which is slidably received in the slot 34. The head of the stop screw 32 cooperates with the slot 34 to prevent the stop screw 32 from rotating.

A thumb screw 42 is threadedly received in a tapped hole 44 provided in a side 46 of the electrode holder 10 and communicating with the cavity 26. By rotating the thumb screw 42, it can be moved so as to engage and disengage the thumb nut 24.

A set screw 48 is threadedly received in another tapped hole 50 provided in the side 46 of the electrode holder 10 and communicating with the reamed hole 20. By rotating the set screw 48, it can be moved into and out of engagement with the fusing electrode 12.

In order to adjust the position of the fusing electrode 12, the set screw 48 would be disengaged from the fusing electrode 12 and the thumb screw 42 would be disengaged from the thumb nut 24. By rotating the thumb nut 24 in an appropriate direction (the countersink 27 facilitating such manual rotation), the stop screw 32 is moved further into the reamed hole 20, thereby forcing the fusing electrode 12 a further distance out of the reamed hole 20. The reverse rotation of the thumb nut 24 would, of course, result in the stop screw 32 being moved further into the slot 34, thereby permitting the electrode 12 to be moved further into the reamed hole 20. Once the position of the electrode 12 has been adjusted as desired, the thumb screw 42 and the set screw 48 are reengaged with the thumb nut 24 and the fusing electrode 12, respectively, in order to lock the fusing electrode 12 in its adjusted position. Once the thumb nut 24 has been locked in place by the thumb screw 42, the stop screw 32 is effectively locked in place to thereby function as a stop which prevents the fusing electrode 12 from being pushed back into the reamed hole 20.

It will be understood that the embodiment described above is merely exemplary and that persons skilled in the art may make many variations and modifications without departing from the spirit and scope of the invention. For instance, if it is desired to automatically adjust the position of the electrode 12, the thumb nut 24 could be replaced by a gear, the rotation of the gear being controlled by a rack which is moved by a stepping motor. In order to provide completely automatic adjustment, a cam system could be employed to automatically lock and unlock the set screw 48. All such modifications and variations are intended to be included within the scope of the invention as defined by the appended claims.

I claim:

1. A combination comprising a fusing machine and an electrode holder secured to said fusing machine in an operative position thereon, said electrode holder having a first hole for receiving an electrode, positioning means extending into said first hole for positioning said electrode in said first hole, and adjusting means for adjusting the extent to which said positioning means extends into said first hole while said electrode holder is in operative position on said fusing machine, whereby said adjusting means cooperates with said positioning means to permit the adjustment of the position of said electrode relative to said electrode holder while said electrode holder is mounted in said operative position on said fusing machine.

2. A combination according to claim 1, wherein said first hole is formed in a lower end of said holder, said holder has a slot provided in an upper end of said holder, remote from said lower end, a cavity communicating with said first hole and disposed between said slot and said first hole, said cavity extending to an outer surface of said holder, and a second hole extending from said slot to said cavity, and said positioning means includes an externally threaded member which extends from said slot to said second hole and said cavity into said first hole.

3. A combination according to claim 2, wherein said adjusting means includes an internally threaded member disposed in said cavity and threadedly received on said externally threaded member such that the rotation of said internally threaded member results in the axial movement of said externally threaded member, whereby the position of said electrode can be adjusted in response to the rotation of said internally threaded member.

4. A combination according to claim 3, wherein said externally threaded member includes a head positioned in said slot, said head cooperating with said slot to prevent said externally threaded member from rotating in response to the rotation of said internally threaded member.

5. A combination according to claim 4, further comprising first locking means for locking the angular position of said internally threaded member to thereby lock the axial position of said externally threaded member.

6. A combination according to claim 5, wherein said first locking means includes a thumb screw movable between a first position in which said thumb screw engages said internally threaded member and a second position in which said thumb screw does not engage said internally threaded member.

7. A combination according to claim 5, further comprising second locking means for locking said electrode in place in said first hole.

8. A combination according to claim 7, wherein said second locking means includes a set screw movable between a first position in which said set screw engages said electrode and a second position in which said set screw does not engage said electrode.

9. A combination according to claim 7, wherein said set screw is moved between said first position and said second position by a cam system, whereby said set screw can be automatically moved into and out of engagement with said electrode.

10. A combination according to claim 3, wherein said attaching means includes means for securing the holder to said fusing machine so that a rear surface of said holder faces said fusing machine.

11. A combination according to claim 10, wherein said outer surface is a front surface of said holder opposite from said rear surface.

12. A combination according to claim 11, wherein said cavity extends from said front surface of said holder to said rear surface of said holder.

13. A combination according to claim 12, further comprising a countersink provided on said front surface of said holder and communicating with said cavity to facilitate the manual rotation of said internally threaded member.

14. A combination according to claim 3, wherein said internally threaded member is a thumb nut and said externally threaded member is a stop screw.

15. A combination according to claim 14, wherein said stop screw is mounted for reciprocating movement in said first hole.

16. A combination according to claim 3, wherein said externally threaded member is a stop screw and said internally threaded member is a gear.

17. A combination according to claim 16, wherein said adjusting means further includes rotating means for rotating said gear.

18. A combination according to claim 17, wherein said rotating means includes a rack, which is in meshing engagement with said gear and a stepping motor, which is attached to said rack so as to move said rack in response to the rotation of said stepping motor, whereby the position of said electrode is automatically adjusted.

19. A combination according to claim 18, wherein said stop screw is mounted for reciprocating movement in said first hole.

* * * * *